United States Patent [19]

Penz et al.

[11] Patent Number: 4,533,214

[45] Date of Patent: Aug. 6, 1985

[54] BIAXIAL SUBSTRATES IN LIGHT MODULATING DEVICES

[75] Inventors: Perry A. Penz, Richardson, Tex.; Robert J. Petcavich, Carbondale, Pa.; William P. Stearns, Richardson; Larry W. Sanders, Wylie, both of Tex.

[73] Assignee: Texas Instruments Incorporated, Dallas, Tex.

[21] Appl. No.: 531,574

[22] Filed: Sep. 12, 1983

Related U.S. Application Data

[63] Continuation of Ser. No. 304,134, Sep. 21, 1981, abandoned.

[51] Int. Cl.$^3$ ............................................. G02F 1/13
[52] U.S. Cl. ................................... 350/334; 350/337; 350/339 R; 350/398
[58] Field of Search ............ 350/337, 398, 334, 339 R

[56] References Cited

U.S. PATENT DOCUMENTS

| | | | |
|---|---|---|---|
| 2,344,117 | 3/1944 | Vierling et al. | 350/398 X |
| 3,322,613 | 5/1967 | Rasmussen | 350/398 X |
| 3,869,196 | 3/1975 | Kubota | 350/337 |
| 4,025,164 | 5/1977 | Doriguzzi et al. | 350/337 |
| 4,229,498 | 10/1980 | Suzuki et al. | 350/337 X |

FOREIGN PATENT DOCUMENTS 1408966 10/1975 United Kingdom .

OTHER PUBLICATIONS

Penz, P. A. et al., "Color-Free Plastic LCD with High Reliability," *Soc. for Information Display 1984 Digest*, pp. 133–136.

*Primary Examiner*—John K. Corbin
*Assistant Examiner*—Richard F. Gallivan
*Attorney, Agent, or Firm*—Carlton Hoel; Melvin Sharp; N. Rhys Merrett

[57] ABSTRACT

A light modulating device such as a liquid crystal display or polarizer is fabricated using optically biaxial plastic material as a substrate. The plastic biaxial material replaces the glass substrate of the LCD, or the cellulose acetate butyrate (CAB) of the polarizer. The biaxial material is a type of stretched plastic, which is more flexible than glass, and much thinner in typical display applications. Typical plastic biaxial materials are chemically stable with liquid crystals and much more stable than isotropic plastics (CAB). The material is optically anistropic, but optical axes of the material are chosen to be outside the field of view over which the device will be observed.

11 Claims, 6 Drawing Figures

BIAXIAL SUBSTRATES IN LIGHT MODULATING DEVICES

This application is a continuation of application Ser. No. 304,134, filed 9/21/81 abandoned.

BACKGROUND OF THE INVENTION

This invention relates to light modulating devices using polarized light, and more specifically to the material makeup of liquid crystal displays and polarizers.

The fabrication of a liquid crystal display (polarizer), in its simplest state, consists of a light modulating element, such as liquid crystal (polyvinyl alcohol stained with a absorbing agent such as iodine) situated between two strips of an isotropic material, typically glass. In liquid crystal displays currently in use, the structure is much more complex. A transparent electrode pattern layer, used to switch the liquid crystal from one state to another, is required. The presence of this electrode layer adds the requirement that the blocking layer be dielectric to prevent electrochemical interaction. The light modulating element of a polarizer presents a similar problem. In present application, polyvinyl alcohol is contained between two strips of an isotropic material, cellulose acetate butyrate (CAB). The CAB is not reactive with the PVA but is somewhat porous to water and other foreign substances permitting the PVA to become contaminated.

Substrate materials having anisotropic properties have not been used, as they interfered with the polarization of the light. There are available anisotropic materials having biaxial properties. One of these materials is a type of stretched polyester (plastic). This material is composed of polymer chains which are in disarray in the material's original condition. When the material is stretched, the chains are oriented lengthwise along the axis of the stretch direction. This stretching and accompanying alignment of chains defines the optical axis of the material. By careful control of the angle of the optical axes and proper alignment of the optical axes of the material with optical axis of the light modulating material, this biaxial material can be substituted for isotropic material. In addition, these plastics are very chemically stable and not likely to react with compounds used in light-modulating devices.

SUMMARY OF THE INVENTION

One aspect of the present invention is embodied in a liquid crystal display having as a substrate a plastic material possessing biaxial optical properties. In this application, the plastic material replaces the glass layer in a typical liquid crystal display assembly. The material is approximately one-third of the thickness of glass, thereby reducing the total height of the display. Another aspect of the invention is embodied in a polarizer comprising a light-modulating compound sealed between two layers of the biaxial material. Since the twisted nematic display requires two polarizers, the display could be made using the polarizers as the substrates, reducing thickness and cost.

Some light-modulating devices make use of the birefringence, or ability of certain materials to separate light into components which travel at different velocities, to produce desired results. In a twisted nematic liquid crystal display transparent electrodes are used to cause electrical fields to be generated through the liquid crystal. The electrical field causes the molecules of the liquid crystal to be oriented such that polarized light passes through the crystal but is absorbed by a polarizer beneath the liquid crystal. When the electric field is not present, the molecules return to their normal alignment and light passes through the crystal in such a way that it is not absorbed by the rear polarizer but is reflected back out of the display.

In a polarizer, the absorbing molecules are aligned in a certain direction and are not re-oriented. The electrical field of light which is polarized parallel to the polarizer molecule alignment is absorbed by the polarizer. The light whose electrical field polarization is perpendicular to the polarizer molecule alignment will be passed through the polarizer. In each case, the light entering the device has been altered for a specific purpose. In order that the light reflected after modulation not be further altered, or altered before modulation, material external to the modulating element must pass light with no polarization distortion. This has previously only been possible with isotropic materials, such as glass or cellulose acetate butyrate. Materials technology has advanced up to the point that materials are now available that are anisotropic, but still capable of meeting the requirements for polarized light-modulating device enclosures. These materials include, for example, a plastic that is stretched, resulting in the material becoming biaxial. One such material is available from the American Hoechst Co. under the name Hostapan EH-292. If the optical axes of the material are at a large angle to the normal angle of the material and arranged to be parallel to the optic axis of the light modulating layer, no optical interference would occur.

DETAILED DESCRIPTION OF THE DRAWINGS

Figure 1:
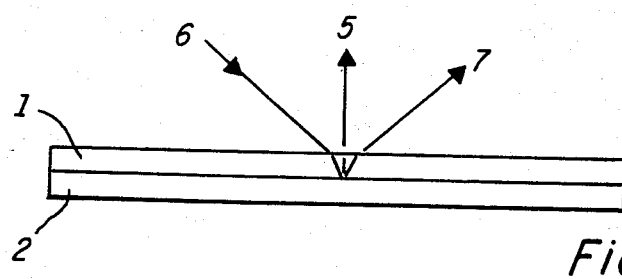
FIG. 1 is a cross section of a strip of stretched polyester material, showing the optical characteristics of the material.

Referring now to FIG. 1, there is shown a strip of biaxial material 1 comprised of stretched polyester. For clarity of explanation, a reflector 2 is shown beneath the material. When this biaxial polyester is stretched, the optical axes of the material are defined. When the axes are defined so that they are outside the field of view of light incident upon the material from all angles, the anisotropy of the material is not evident. Light entering the material at an angle as at 6 is bent toward the normal 5 as it enters the material. Upon exiting the material, the reflected light is bent away from normal 5, back to an angle from the horizontal 7, equal to the entry angle 6. This occurs as the material has a higher index of refraction than air. Total internal reflection prevents light from leaving a material, with an index of 1.5, at a larger angle with respect to normal than 42°. This means that if the optical axes are at 45° or more with respect to normal, a view from outside the plastic will not reveal any changes of polarization of light incident with polarization parallel to the plane defined by the optical axes of the material. The material may be designed for a specific application by stretching a certain amount to achieve desired optical axes orientation.

Figure 2:
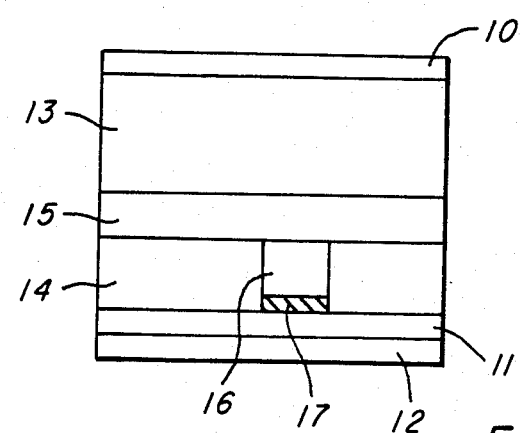
FIG. 2 is a cross-section of a typical prior LCD structure.
Figure 3:
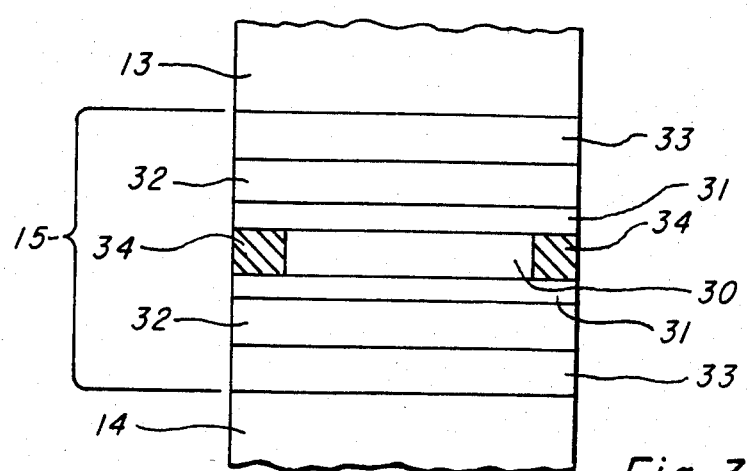
FIG. 3 is an expanded cross-section of the liquid crystal cavity of a known LCD structure.

In the cross-sectional view of a liquid crystal display shown in FIG. 2, the composition of the display can be seen. A polarizer 10 passes correctly polarized light through to the upper layer of glass 13 which, being isotropic passes light to the liquid crystal cavity 15. The transmission axis of the polarizer is aligned parallel to the optic axes of the liquid crystal. The modulated light then passes through the lower glass 14, through polarizer 11, and is returned by reflector 12. The light travels back out of the display in the same way. FIG. 3 is a cross-section view of the liquid crystal cavity 15. Directly adjacent to the upper glass 13 and lower glass 14 are transparent electrode pattern layers 33. Since liquid crystal could possibly react electrochemically, a dielectric blocking layer 32, typically silicon dioxide is introduced to separate the glass and electrode pattern from the liquid crystal 30. The alignment layer 31 is very important in the display, as it is the mechanism by which alignment in the liquid crystal 30 is promoted. The liquid crystal 30 is contained in the structure by a seal and spacer material 34, usually some type of plastic.

Figure 4:
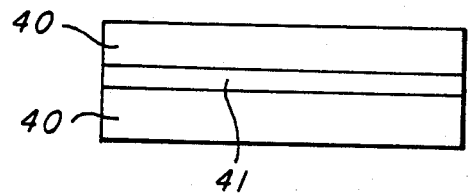
FIG. 4 is a cross section of a polarizer device of a preferred embodiment of the present invention.

FIG. 4 is a cross-section drawing of a polarizer in a preferred embodiment of the present invention. The modulating element, polyvinyl alcohol 41, stained with a suitable agent, for example, iodine, is situated between two strips of plastic biaxial material 40. PVA is an adhesive itself, but in some cases, a transparent adhesive will additionally be used.

Figure 5:
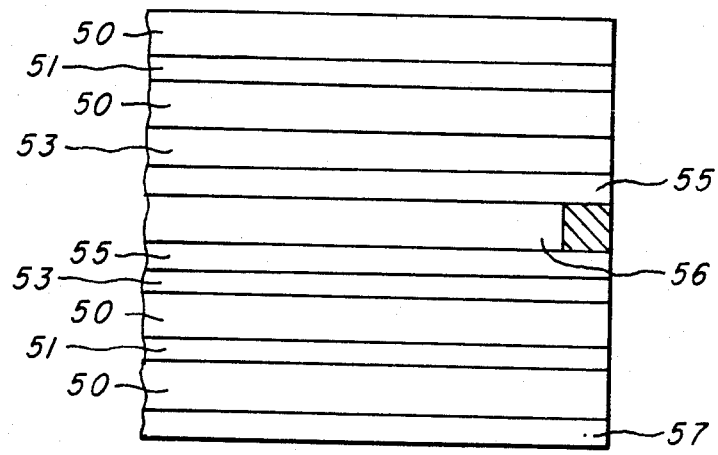
FIG. 5 is a cross section of a preferred embodiment of an LCD of the present invention having polarizers as substrates.

FIG. 5 is a cross-sectional drawing of a preferred embodiment of the present invention in a liquid crystal display using polarizers as substrates. A layer of polyvinyl alcohol 51 is situated between strips of plastic biaxial material 50. A transparent electrode pattern layer 53 of, for example, indium oxide or tin oxide, is next to the biaxial material. An alignment layer 55 of, for example, polyvinyl alcohol or polyimide, promotes the molecular alignment of liquid crystal 56. Underneath the liquid crystal are the alignment layer 55, electrode pattern 53 and polarizer comprising the PVA 51, and biaxial material 50. At the bottom of the structure is a reflector 57.

Figure 6:
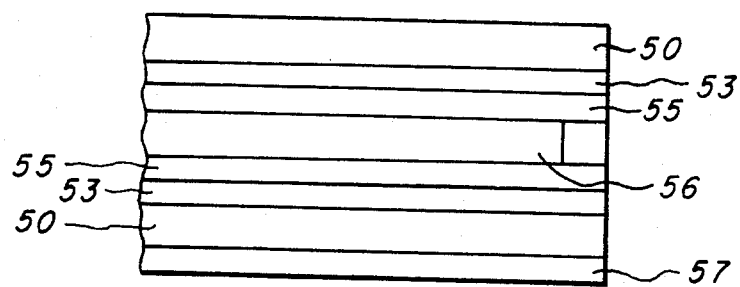
FIG. 6 is a cross section of a preferred embodiment of an LCD of the present invention having single layers of biaxial material as substrates.

FIG. 6 is a cross-section view of another preferred embodiment of the present invention using single layers of plastic biaxial material as substrates for a liquid crystal display. The plastic biaxial material 50 replaces the polarizer as an outside layer, with the electrode layers 53, alignment layers 55, liquid crystal 56, and reflector 57 as shown in FIG. 5.

The use of biaxial material such as stretched polyester as a substrate is a significant advance in the make-up of light-modulating devices. These structures are no longer restricted to the use of isotropic materials and their inherent weak points. The use of biaxial substrates will allow fabrication of devices that are much more thin, which is a prime consideration in many applications of today. Also, reliability of these devices will be greatly enhanced, as the polyester and other plastics are much more stable chemically.

What is claimed is:

1. A light-modulating device structure comprising a light-modulating means having a substrate of anisotropic biaxial material, said biaxial material characterized by the angles between the normal to said substrate and each of its two optic axes being greater than the angles in said material between said normal and the light rays of interest being modulated by said means.

2. A structure as in claim 1 wherein said light-modulating means is a liquid crystal.

3. A structure as in claim 1 wherein said light-modulating means is polyvinyl alcohol stained with iodine.

4. A structure as in claim 1 wherein said anisotropic biaxial material is a type of plastic.

5. A structure as in claim 1, wherein said anisotropic biaxial material has optical axes that are at an angle of greater than 45° from the normal.

6. A structure as in claim 1 wherein said anisotropic biaxial material of said structure is aligned with said light modulating means so that the projection planes of the optical axes of said anisotropic biaxial material and said light modulating means are parallel.

7. A structure as in claim 1, wherein said anisotropic biaxial material of said structure is aligned with said light modulating means so that the projection planes of the optical axes of said anisotropic biaxial material and light modulating means are perpendicular.

8. A liquid crystal display device having a substrate of anisotropic biaxial material, said biaxial material characterized by the angles between the normal to said substrate and each of its two optic axes are greater than the angles in said material between said normal and the light rays of interest being modulated by the liquid crystal.

9. A light polarizing device comprised of a volume of polyvinyl alcohol stained with an agent suitable for light modulation, sealed in between two layers of anisotropic biaxial material, said biaxial material characterized by the angles between the normal to said substrate and each of its two optic axes being greater than the angles in said material between said normal and the light rays of interest being polarized by said stained polyvinyl alcohol.

10. A light polarizing device as in claim 9, wherein said agent suitable for light modulation is iodine.

11. A liquid crystal display device having as a substrate a light polarizing device as in claim 9.

* * * * *